(12) United States Patent
Cha et al.

(10) Patent No.: US 7,292,165 B2
(45) Date of Patent: Nov. 6, 2007

(54) CONTEXT-BASED ADAPTIVE ARITHMETIC CODING AND DECODING METHODS AND APPARATUSES WITH IMPROVED CODING EFFICIENCY AND VIDEO CODING AND DECODING METHODS AND APPARATUSES USING THE SAME

(75) Inventors: Sang-chang Cha, Hwaseong-si (KR); Woo-jin Han, Suwon-si (KR)

(73) Assignee: Samsung Elctronics Co., Ltd., Suwon (KR)

( * ) Notice: Subject to any disclaimer, the term of this patent is extended or adjusted under 35 U.S.C. 154(b) by 0 days.

(21) Appl. No.: 11/405,573

(22) Filed: Apr. 18, 2006

(65) Prior Publication Data

US 2006/0232454 A1    Oct. 19, 2006

Related U.S. Application Data

(60) Provisional application No. 60/672,548, filed on Apr. 19, 2005.

(30) Foreign Application Priority Data

Jul. 1, 2005    (KR)    ............... 10-2005-0059369

(51) Int. Cl.
H03M 7/00    (2006.01)
(52) U.S. Cl. ........................... 341/107; 341/59
(58) Field of Classification Search ............ 341/107, 341/59; 375/240.25, 240.12
See application file for complete search history.

(56) References Cited

U.S. PATENT DOCUMENTS

| | | | |
|---|---|---|---|
| 6,404,814 B1 * | 6/2002 | Apostolopoulos et al. | 375/240.12 |
| 6,492,916 B1 * | 12/2002 | Schwartz et al. | 341/59 |
| 2004/0151252 A1 * | 8/2004 | Sekiguchi et al. | 375/240.25 |
| 2004/0240559 A1 * | 12/2004 | Prakasam et al. | 375/240.25 |

FOREIGN PATENT DOCUMENTS

| | | |
|---|---|---|
| DE | 102 18 541 A1 | 4/2003 |
| JP | 2003-319391 A | 11/2003 |
| JP | 2004-135251 A | 4/2004 |

OTHER PUBLICATIONS

Wen-Hsiao Png, et al., "Context-based binary Arithmetic coding for fine granuality scalability", Signal Processing and Its Applications, 2003. Proceedings. Seventh International Symposium on vol. 1, Jul. 1-4, 2006, pp. 105-108.

Deltev Marpe, et al., "Video Compression using context-based adaptive arithmetic codeing", Image Processing 2001. Proceedings. 2001 International Conference on vol. 3, Oct. 7-10, 2001, pp. 558-561, vol. 3.

Detlev Marpe, et al., "Context-based adaptive binary arithmetic coding in JVT/H.26L", Image Processing. 2002. Proceedings. 2002 International Conference on vol. 2, Sep. 22-25, 2002, pp. II-513-II-516, vol. 2.

* cited by examiner

*Primary Examiner*—Jean Bruner Jeanglaude
(74) *Attorney, Agent, or Firm*—Sughrue Mion, PLLC

(57) ABSTRACT

Context-based adaptive arithmetic coding and decoding methods and apparatuses with improved coding efficiency and video coding and decoding methods and apparatuses using the same are provided. The method for performing context-based adaptive arithmetic coding on a given slice in an enhancement layer frame of a video signal having a multi-layered structure includes steps of resetting a context model for the given slice to a context model for a base layer slice at the same temporal position as the given slice, arithmetically coding a data symbol of the given slice using the reset context model, and updating the context model based on the value of the arithmetically coded data symbol.

60 Claims, 9 Drawing Sheets

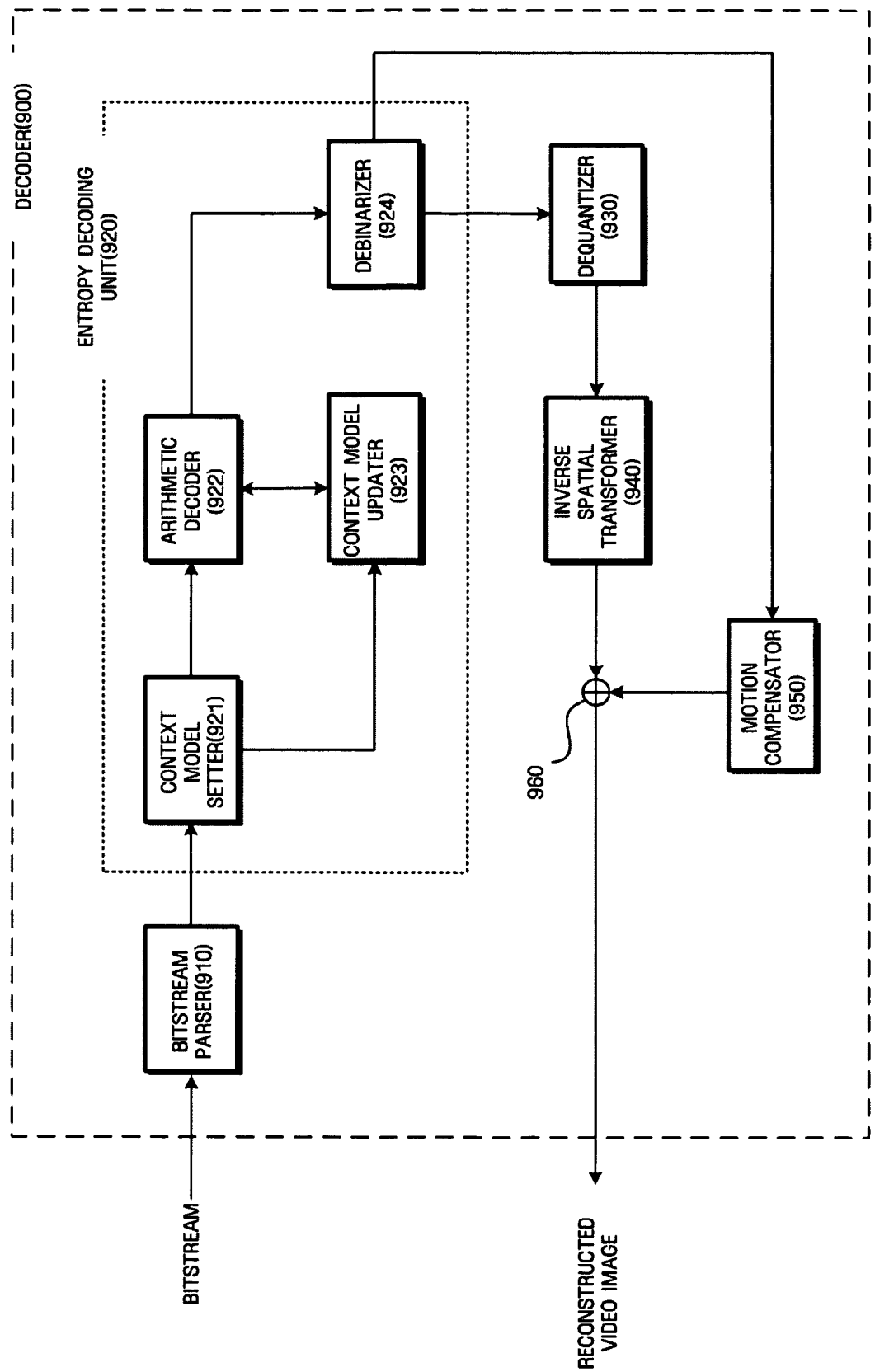

CONTEXT-BASED ADAPTIVE ARITHMETIC CODING AND DECODING METHODS AND APPARATUSES WITH IMPROVED CODING EFFICIENCY AND VIDEO CODING AND DECODING METHODS AND APPARATUSES USING THE SAME

CROSS-REFERENCE TO RELATED APPLICATIONS

This application claims priority from Korean Patent Application No. 10-2005-0059369 filed on Jul. 1, 2005 in the Korean Intellectual Property Office, and U.S. Provisional Patent Application No. 60/672,548 filed on Apr. 19, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to context-based adaptive arithmetic coding and decoding with improved coding efficiency, and more particularly, to context-based adaptive arithmetic coding and decoding methods and apparatuses providing improved coding efficiency by initializing a context model for a given slice of an input video to a context model for a base layer slice at the same temporal position as the given slice for arithmetic coding and decoding.

2. Description of the Related Art

A video encoder performs entropy coding to convert data symbols representing video input elements into bitstreams suitably compressed for transmission or storage. The data symbols may include quantized transform coefficients, motion vectors, various headers, and the like. Examples of the entropy coding include predictive coding, variable length coding, arithmetic coding, and so on. Particularly, arithmetic coding offers the highest compression efficiency.

Successful entropy coding depends upon accurate probability models of symbols. In order to estimate a probability of symbols to be coded, context-based adaptive arithmetic coding utilizes local, spatial or temporal features. A Joint Video Team (JVT) scalable video model utilizes the context-based adaptive arithmetic coding in which probability models are adaptively updated using the symbols to be coded.

However, in order to provide for adequate coding efficiency, the context-based adaptive arithmetic coding method requires an increased number of coded blocks and accumulation of information. Thus, the conventional context-based adaptive arithmetic coding method has a drawback in that when a context model is intended to be initialized to a predefined probability model for each slice, unnecessary bits may be consumed to reach a predetermined coding efficiency after initialization.

SUMMARY OF THE INVENTION

The present invention provides video coding and decoding methods and apparatuses improving coding efficiency and reducing error propagation by initializing a context model for a given slice to a context model for a base layer slice at the same temporal position as the given slice.

The above stated aspect as well as other aspects of the present invention will become clear to those skilled in the art upon review of the following description.

According to an aspect of the present invention, there is provided a method for performing context-based adaptive arithmetic coding on a given slice in an enhancement layer frame of a video signal having a multi-layered structure, the method including: resetting a context model for the given slice to a context model for a base layer slice at the same temporal position as the given slice; arithmetically coding a data symbol of the given slice using the reset context model; and updating the context model based on a value of the arithmetically coded data symbol.

According to another aspect of the present invention, there is provided a method for performing context-based adaptive arithmetic decoding on a given slice in an enhancement layer frame of a video signal having a multi-layered structure, the method including: resetting a context model for the given slice to a context model for a base layer slice at the same temporal position as the given slice; arithmetically decoding a bitstream corresponding to the given slice using the reset context model to generate a data symbol of the given slice; and updating the context model based on a value of the data symbol.

According to still another aspect of the present invention, there is provided a method for performing context-based adaptive arithmetic coding on a given slice in an enhancement layer frame of a video signal having a multi-layered structure, the method including: resetting a context model for the given slice to at least one of a context model for a base layer slice at the same temporal position as the given slice, a context model for a slice coded temporally before the given slice, and a predetermined value; arithmetically coding a data symbol of the given slice using the reset context model; and updating the context model based on a value of the arithmetically coded data symbol.

According to yet another aspect of the present invention, there is provided a method for performing context-based adaptive arithmetic decoding on a given slice in an enhancement layer frame of a video signal having a multi-layered structure, the method including: resetting a context model for the given slice to at least one of a context model for a base layer slice at the same temporal position as the given slice, a context model for a slice decoded temporally before the given slice, and a predetermined value; arithmetically decoding a bitstream corresponding to the given slice using the reset context model to generate a data symbol of the given slice; and updating the context model based on a value of the data symbol.

According to a further aspect of the present invention, there is provided a video coding method including a method for performing context-based adaptive arithmetic coding on a given slice in an enhancement layer frame having a multi-layered structure, the video coding method including: subtracting a predicted image for the given slice from the given slice and generating a residual image: performing spatial transform on the residual image and generating a transform coefficient; quantizing the transform coefficient; resetting a context model for the given slice to a context model for a base layer slice at the same temporal position as the given slice; arithmetically coding a data symbol of the given slice using the reset context model; updating the context model based on a value of the arithmetically coded data symbol; generating a bitstream containing the arithmetically coded data symbol; and transmitting the bitstream.

According to yet a further aspect of the present invention, there is provided a video decoding method including a method for performing context-based adaptive arithmetic decoding on a given slice in an enhancement layer frame having a multi-layered structure, the video decoding method including: parsing a bitstream and extracting data about the given slice to be reconstructed; resetting a context model for the given slice to a context model for a base layer slice at the same temporal position as the given slice according to the data; arithmetically decoding a data symbol corresponding to the given slice using the reset context model to generate a data symbol of the given slice; updating the context model based on a value of the data symbol; dequantizing the data symbol to generate a transform coefficient; performing inverse spatial transform on the transform coefficient to reconstruct a residual image obtained by subtracting a predicted image from the given slice; and adding the predicted image reconstructed by motion compensation to the reconstructed residual image and reconstructing the given slice.

According to still yet another aspect of the present invention, there is provided a method for coding a given slice in an enhancement layer frame of a video signal having a multi-layered structure, the method including: subtracting a predicted image for the given slice from the given slice and generating a residual image; performing spatial transform on the residual image and generate a transform coefficient; quantizing the transform coefficient; resetting a context model for the given slice to at least one of a context model for a base layer slice at the same temporal position as the given slice, a context model for a slice coded temporally before the given slice, and a predetermined value; arithmetically coding a data symbol of the given slice using the reset context model; updating the context model based on a value of the arithmetically coded data symbol; generating a bitstream containing the arithmetically coded data symbol; and transmitting the bitstream.

According to still yet a further aspect of the present invention, there is provided a method for decoding a given slice in an enhancement layer frame of a video signal having a multi-layered structure, the method including: parsing a bitstream and extracting data about the given slice to be reconstructed; resetting a context model for the given slice to at least one of a context model for a base layer slice at the same temporal position as the given slice, a context model for a slice decoded temporally before the given slice, and a predetermined value according to the data; arithmetically decoding a bitstream corresponding to the given slice using the reset context model to generate a data symbol of the given slice; updating the context model based on a value of the data symbol; dequantizing the data symbol to generate a transform coefficient; performing inverse spatial transform on the transform coefficient to reconstruct a residual image obtained by subtracting a predicted image from the given slice; and adding the predicted image reconstructed by motion compensation to the reconstructed residual image and reconstructing the given slice.

According to an aspect of the present invention, there is provided a video encoder for compressing a given slice in an enhancement layer frame having a multi-layered structure, the encoder including: a unit which subtracts a predicted image for the given slice from the given slice and generates a residual image; a unit which performs spatial transform on the residual image and generates a transform coefficient; a unit which quantizes the transform coefficient; a unit which resets a context model for the given slice to a context model for a base layer slice at the same temporal position as the given slice; a unit which arithmetically codes a data symbol of the given slice using the reset context model; a unit which updates the context model based on a value of the arithmetically coded data symbol; a unit which generates a bitstream containing the arithmetically coded data symbol; and a unit which transmits the bitstream.

According to another aspect of the present invention, there is provided a video decoder for reconstructing a given slice in an enhancement layer frame having a multi-layered structure, the decoder including: a unit which parses a bitstream and extracts data about the given slice to be reconstructed; a unit which resets a context model for the given slice to a context model for a base layer slice at the same temporal position as the given slice according to the data; a unit which arithmetically decodes a bitstream corresponding to the given slice using the reset context model to generate a data symbol of the given slice; a unit which updates the context model based on a value of the data symbol; a unit which dequantizes the data symbol to generate a transform coefficient; a unit which performs inverse spatial transform on the transform coefficient to reconstruct a residual image obtained by subtracting a predicted image from the given slice; and a unit which adds the predicted image reconstructed by motion compensation to the reconstructed residual image and reconstructs the given slice.

According to yet another aspect of the present invention, there is provided a video encoder for compressing a given slice in an enhancement layer frame having a multi-layered structure, the encoder including: a unit which subtracts a predicted image for the given slice from the given slice and generates a residual image; a unit which performs spatial transform on the residual image and generates a transform coefficient; a unit which quantizes the transform coefficient; a unit which resets a context model for the given slice to at least one of a context model for a base layer slice at the same temporal position as the given slice and a context model for a slice coded temporally before the given slice, and a predetermined value; a unit which arithmetically codes a data symbol of the given slice using the reset context model; a unit which updates the context model based on the value of the arithmetically coded data symbol; a unit which generates a bitstream containing the arithmetically coded data symbol; and a unit which transmits the bitstream.

According to still yet another aspect of the present invention, there is provided a video decoder for reconstructing a given slice in an enhancement layer frame having a multi-layered structure, the decoder including: a unit which parses a bitstream and extracts data about the given slice to be reconstructed; a unit which resets a context model for the given slice to at least one of a context model for a base layer slice at the same temporal position as the given slice and a context model for a slice decoded temporally before the given slice according to the data and a predetermined value; a unit which arithmetically decodes a bitstream corresponding to the given slice using the reset context model to generate a data symbol of the given slice; a unit which updates the context model based on a value of the data symbol, a unit which dequantizes the data symbol to generate a transform coefficient; a unit which performs inverse spatial transform on the transform coefficient to reconstruct a residual image obtained by subtracting a predicted image from the given slice; and a unit which adds the predicted image reconstructed by motion compensation to the reconstructed residual image and reconstructs the given slice.

BRIEF DESCRIPTION OF THE DRAWINGS

The above and other features and advantages of the present invention will become more apparent by describing in detail exemplary embodiments thereof with reference to the attached drawings, in which:

FIG. 9 is a block diagram of a video decoder according to an exemplary embodiment of the present invention.

DETAILED DESCRIPTION OF THE INVENTION

Figure 1:
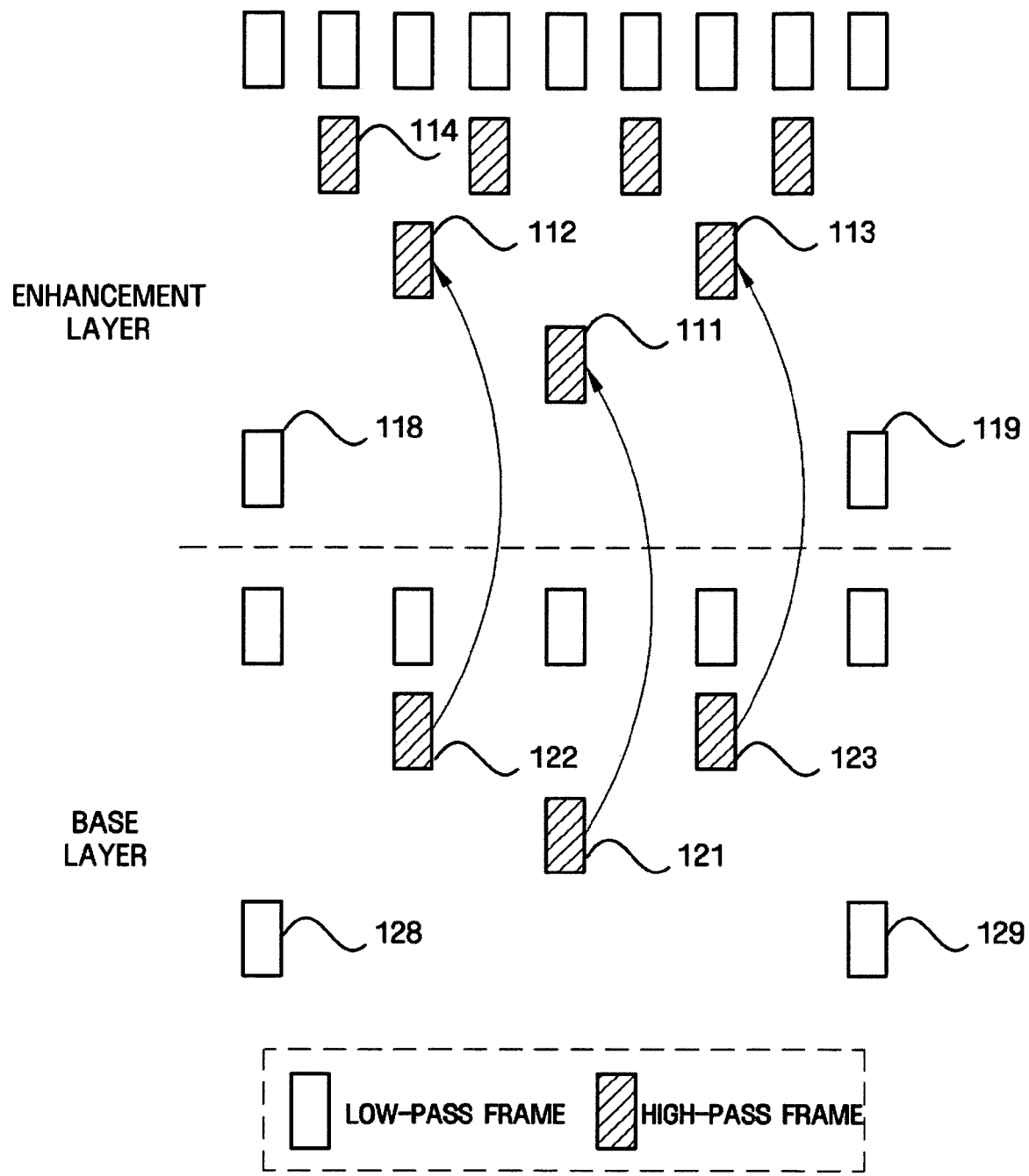
FIG. 1 illustrates a context-based adaptive arithmetic coding method according to a first exemplary embodiment of the present invention.

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Context-based Adaptive Binary Arithmetic Coding (CABAC) achieves high compression performance by selecting a probability model for each symbol based on a symbol context, adapting probability estimates corresponding to the probability model based on local statistics and performing arithmetic coding on the symbol. The coding process of the data symbol consists of at most four elementary steps: 1. Binarization; 2. Context modeling; 3. Arithmetic coding; and 4. Probability updating.

1. Binarization

Among Context-based Adaptive Binary Arithmetic Coding (CABAC) techniques, binary arithmetic coding allows a given non-binary valued symbol to be uniquely mapped to a binary sequence. In CABAC, only a binary decision enters a coding process. Non-binary valued symbols, such as transform coefficients or motion vectors, are converted into binary codes prior to the actual arithmetic coding process. This process is similar to converting data symbols to variable length codes except that the binary codes are previously coded by an arithmetic encoder prior to transmission.

For brevity, the present invention will now be discussed along with details on CABAC set forth but the invention is not limited thereto.

The following elementary operations of context modeling, arithmetic coding, and probability updating are recursively performed on the respective bits of the binarized codes, i.e., bins.

2. Context Modeling

A context model, which is a probability model for one or more bins of binarized symbols and chosen based on the recently coded data symbol statistics, stores a probability for each bin to be "1" or "0".

3. Arithmetic Coding

An arithmetic encoder codes each bin based on the chosen probability model. Each bin has only two probability sub-ranges corresponding to values of "1" and "0", respectively.

4. Probability Updating.

The chosen probability model is updated using actually coded values. That is to say, if the bin value is "1", the frequency count of 1's is incremented by one.

In the above-described CABAC technique, since context modeling is performed in units of slices, probability values of context models are initialized using fixed tables at the start of each slice. Compared to the conventional variable length coding (VLC) technique, to offer a higher coding efficiency, the CABAC technique is required that a predetermined amount of information accumulate such that context models are constantly updated using the statistics of the recently coded data symbols. Thus, initializing context models for each slice using predefined probability models may result in unnecessary consumption of bits until degraded performance, which is due to an increase in the number of blocks after initialization, is traded off.

In multi-layered video coding, data symbols of a given slice to be currently coded tend to have a statistical distribution similar to that of data symbols of a base layer slice. Thus, the present invention proposes improved a CABAC technique by reducing a reduction in the coding efficiency immediately after initializing context models using statistical characteristics of the slice coded temporally before the base layer slice as an initial value of a context model for the given slice.

Using the statistical characteristics of the base layer slice improves coding performance and reduces error propagation in a temporally filtered hierarchical structure, for example, a motion-compensated temporally filtered (MCTF) structure.

FIG. 1 illustrates a context-based adaptive arithmetic coding method according to a first exemplary embodiment of the present invention.

A context model for a given slice in an enhancement layer high-pass frame is initialized to a context model for a corresponding slice in a base layer high-pass frame at the same temporal position for multi-layered video coding. For example, a context model for an enhancement layer high-pass frame 111 can be initialized to a context model for a base layer high-pass frame 121 at the same temporal position.

In a video coding method for implementing each layer of a multi-layered structure by MCTF, predetermined frames are referred to for the purpose of maintaining the structure implemented by MCTF. On this account, in a case where an error occurs to a given frame, the error may propagate to a temporally higher level. In the video coding method using MCTF, however, a robust system demonstrating a low error propagation rate can be realized by referring to a context model for a high-pass frame of a base layer for initialization of context models for low-pass frames of an enhancement layer.

Meanwhile, when referring to context models for base layer low-pass frames, some of probability models constituting the context models may be selectively referred to. In this instance, information about whether or not the respective probability models have been referred to may be inserted into a bitstream for transmission to a decoder part.

In the present exemplary embodiment, the context models for enhancement layer low-pass frames 118 and 119 can also be initialized to context models for base layer low-pass frames 128 and 129 at the same temporal positions, respectively, thereby preventing degradation in coding efficiency during an initial stage of frame coding.

When resolution levels of the base layer and the enhancement layer are different from each other, there may not be base layer frames at the same temporal positions as enhancement layer high-pass frames. Referring to FIG. 1, since the frame 114 may not have a frame corresponding to the base layer, the context model corresponding thereto is initialized using a predefined initialization value like in the conventional CABAC coding technique. In addition, the frame 114 may be initialized using a context model for a frame coded temporally before the frame 114, which will now be described with reference to FIG. 2.

Figure 2:
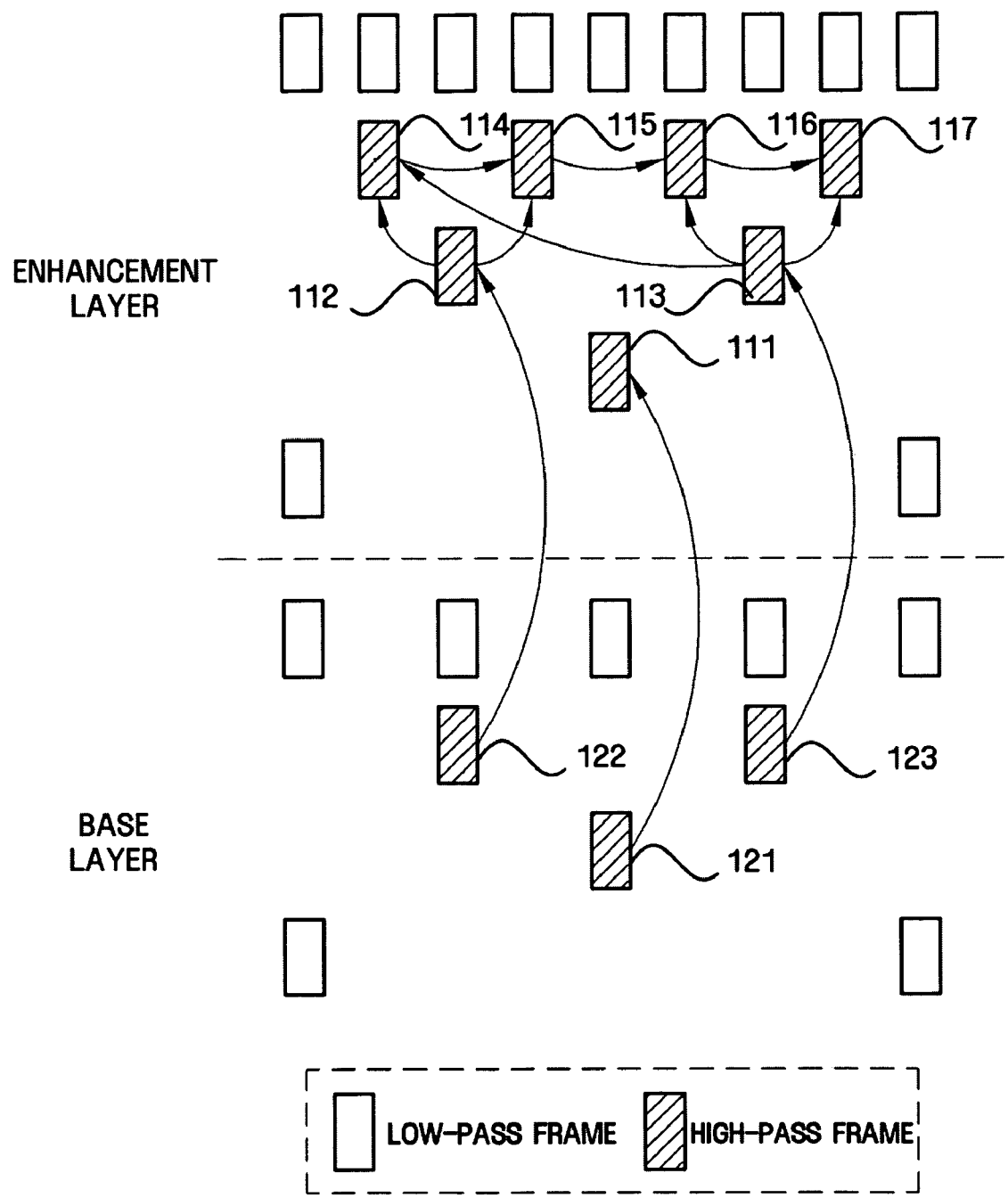
FIG. 2 illustrates a context-based adaptive arithmetic coding method according to a second exemplary embodiment of the present invention.

FIG. 2 illustrates a context-based adaptive arithmetic coding method according to a second exemplary embodiment of the present invention in which a context model for a previously coded frame is used as a context model for an enhancement layer frame having no corresponding base layer frame.

Context models for enhancement layer frames 111 through 113 having corresponding base layer frames at the same temporal positions are initialized to context models for their corresponding base layer frames 121 through 123 as described above with reference to FIG. 1. On the other hand, context models for previously coded frames can be used as context models for enhancement layer frames 114 through 117 having no corresponding base layer frames.

In the temporally filtered hierarchical structure, high-pass frames tend to have similar statistical characteristics with one another. Thus, a context model for a slice coded immediately before the given slice may be used as an initial value of a context model for the given high-pass frame slice. Here, the high-pass frames are coded in the order from the lowest level to the highest level consecutively using a context model for a slice coded immediately before the given slice as an initial value of a context model for the given slice. When a frame is divided into two or more slices, the slice coded immediately before the given slice may indicate a corresponding slice of a neighboring high-pass frame in the same temporal level or a slice coded immediately before the given slice in the same high-pass frame.

Therefore, in a temporally filtered hierarchical structure as shown in FIG. 1, slices in a high-pass frame are coded in order from the lowest level to the highest level consecutively using a context model for a slice coded immediately before the given slice as an initial value of a context model for the given slice. Arrows in FIGS. 1-3 indicate the direction that a context model is referred to. In those exemplary embodiments, the context model for a slice coded temporally before the given slice is also used as an initial value of the context model for the given slice indicated by the arrow.

When a sharp scene change is detected from video inputs, statistical characteristics of a slice that has been coded immediately before a given slice are different from those of the given slice. Thus, the method of coding the given slice using the context model for the slice that has been coded immediately before the given slice may not provide high coding efficiency. In this regard, the present invention can provide for high coding efficiency by using statistical information on a slice in the lower level that is temporally closest to the given slice. Further, the method using the statistical information on a slice in the lower level that is temporally closest to the given slice can reduce error propagation compared to the methods of the first and second exemplary embodiments because an error occurring within a slice can propagate to only a slice at a higher level that uses the slice as a reference.

In another exemplary embodiment, the context model for the slice that has been coded immediately before the given slice or the context model for the slice in the lower level that is temporally closest to the given slice may be selectively referred to.

In alternative exemplary embodiment, only some of probability models constituting a context model of a slice may be selectively referred to. In this instance, as described above, information about whether or not the respective probability models have been referred to may be inserted into a bitstream for transmission to a decoder part.

Figure 3:
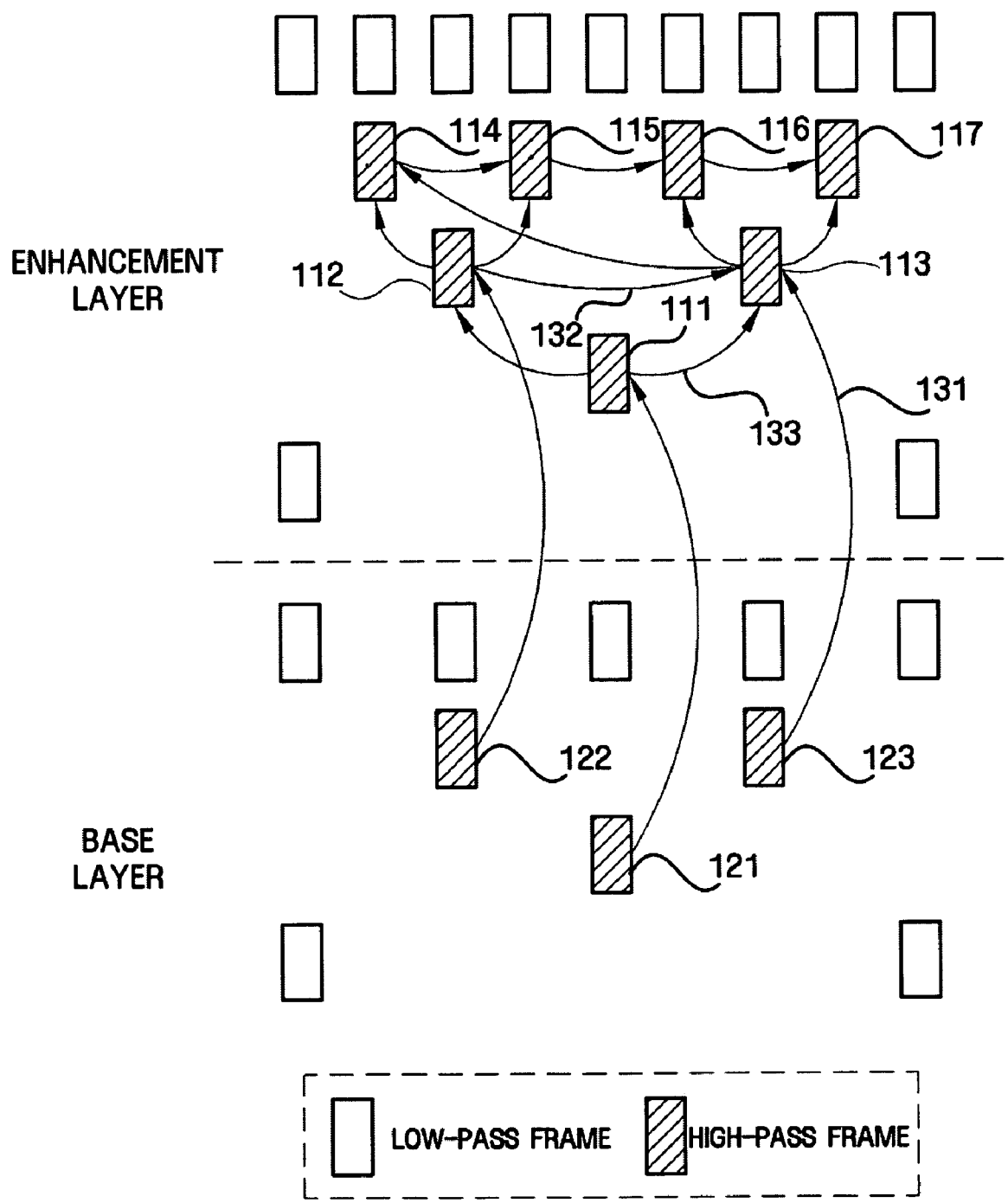
FIG. 3 illustrates a context-based adaptive arithmetic coding method according to a third exemplary embodiment of the present invention.

FIG. 3 illustrates a context-based adaptive arithmetic coding method according to a third exemplary embodiment of the present invention.

A context model for a given slice in an enhancement layer of every high-pass frame is initialized to one selected from context models for a base layer slice at the same temporal position as the given slice and slices coded temporally before the given slice in the same enhancement layer. That is, for slices 114 through 117 without their corresponding base layers at the same temporal position, the context model for the given slice is initialized to one of context models for slices coded temporally before the given slice in the same enhancement layer. For slices 111 through 113 with their corresponding base layers at the same temporal position, the context model for the given slice is initialized to a context model for the corresponding base layer slice or to one of context models for slices coded temporally before the given slice.

Among context models for slices having similar statistical characteristics, a context model that enhances the coding efficiency of a given slice most is selected for performing arithmetic coding of the given slice. This procedure may consist of determining whether or not a slice (e.g., slice 113) is to be arithmetically coded using an empirically predefined initial value, determining whether or not a context model, as indicated by an arrow labeled 131, for a corresponding base layer slice is to be referred to, determining whether or not a context model of a slice coded immediately before the given slice 113, as indicated by an arrow labeled 132, and determining whether a context model for a slice that is temporally closest to the given slice is to be referred to, as indicated by an arrow labeled 133.

Probability models constituting one context model selected for initialization can be selectively used as described above with reference to FIGS. 2 and 3.

In the second and third exemplary embodiments, data is inserted into a bitstream and transmitted to a decoder, the data including information about whether or not a predefined value has been used, information about whether or not a context model of a corresponding base layer slice has been used, information about whether or not a slice coded temporally before the given slice has been used. If the given slice is arithmetically coded by the context model for a base layer slice or a slice coded temporally before the given slice, the data may include information about whether or not each of probability models constituting a context model for a slice coded temporally before the given slice has been used as a reference model.

Figure 4:
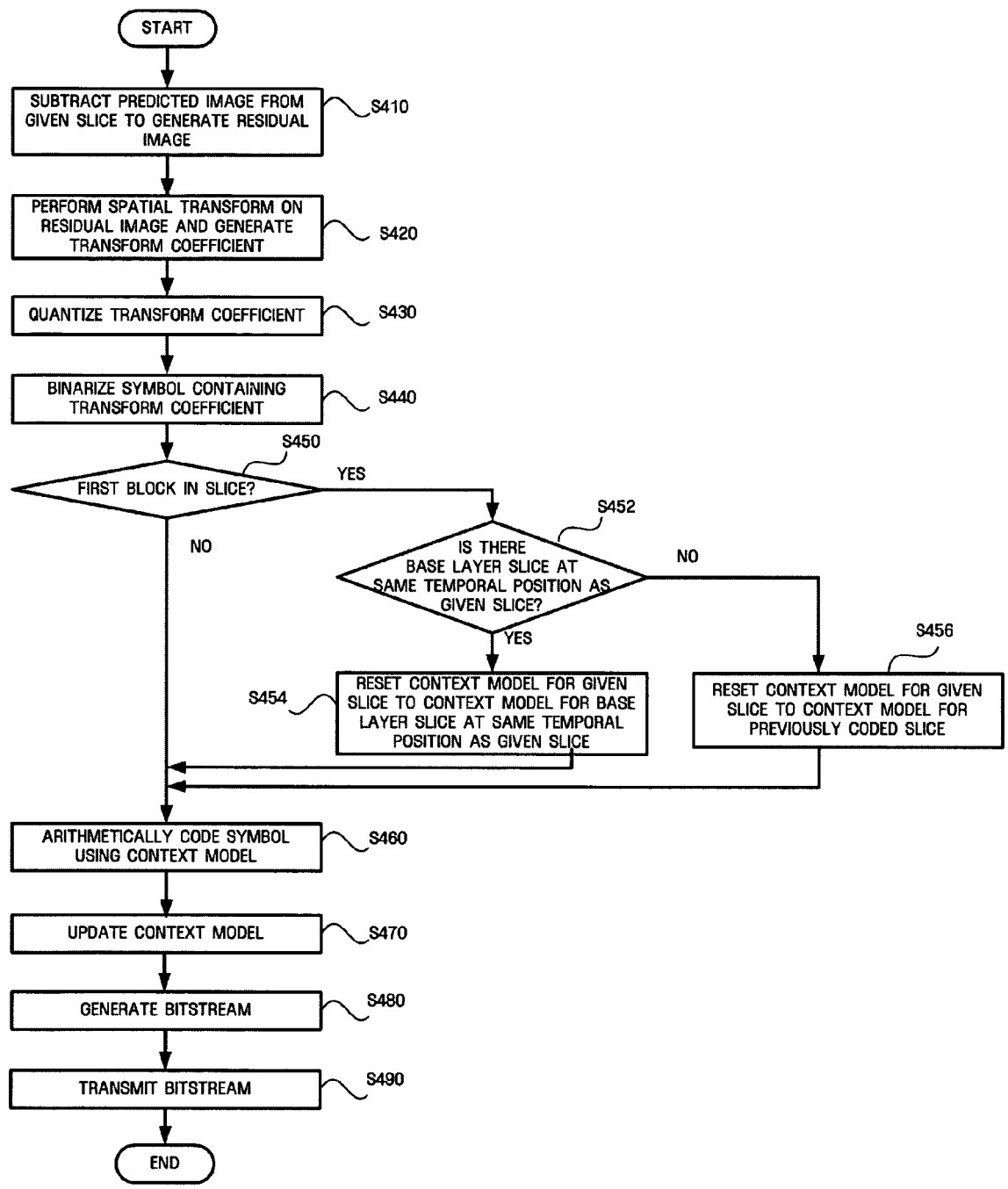
FIG. 4 is a flowchart illustrating a video coding method including a context-based adaptive arithmetic coding method according to an exemplary embodiment of the present invention.

FIG. 4 is a flowchart illustrating a video coding method including a context-based adaptive coding method according to an exemplary embodiment of the present invention.

The video coding method includes subtracting a predicted image for a given slice to be compressed from the given slice to generate a residual signal (step S410), performing spatial transform on the residual signal and generate a transform coefficient (step S420), quantizing data symbols containing a transform coefficient and a motion vector obtained during generation of the predicted image (step S430), entropy coding the quantized data symbols (steps S440 through S470), and generating a bitstream for transmission to a decoder (steps S480 and S490).

The entropy coding process includes binarization (step S440), resetting of a context model (step S454 or S456), arithmetic coding (step S460), and update of a context model (step S470). However, when context-based adaptive arithmetic coding is used instead of CABAC, the binarization step S440 may be skipped.

In the binarization step S440, a data symbol having a non-binary value is converted or binarized into a binary value.

When the block being currently compressed is a first block in the slice in the step S450, a context model for the slice is reset in steps S452 through S456. The entropy coding is performed in units of blocks and a context model is reset in units of slices to ensure independence of slices. In other words, the context model is reset for symbols of the first block in the slice. As the number of blocks to be coded increases, context models corresponding thereto are adaptively updated. In the present exemplary embodiments, a selected context model is reset by referring to a context model for the slice coded temporally before the slice, which is as described above with reference to FIGS. 2 and 3. Also, in the case of using one context model, it can refer to a part of probability models of the context model. In this case, the bit stream can be transferred which contains the information of reference of each probability model.

Examples of a slice that will be used to reset a context model for a given slice are shown in FIGS. 2 and 3. A video coding method including the arithmetic coding method according to the second or third exemplary embodiment of the present invention, as shown in FIG. 2 or 3, may further include selecting one of context models available for reference. Criteria of selecting one of context models available for reference include coding efficiency, an error propagation probability, and so on. In other words, a context model having a highest coding efficiency or a context model having a least error propagation probability may be selected among context model candidates.

In step S460, the binarized symbol is subjected to arithmetic coding according to a probability model having a context model for a previously selected slice as an initial value.

In step S470, the context model is updated based on the actual value of the binarized symbol. For example, if one bin of the data symbol has a value of "0," the frequency count of 0's is increased. Thus, the next time this model is selected, the probability of a "0" will be slightly higher.

Figure 5:
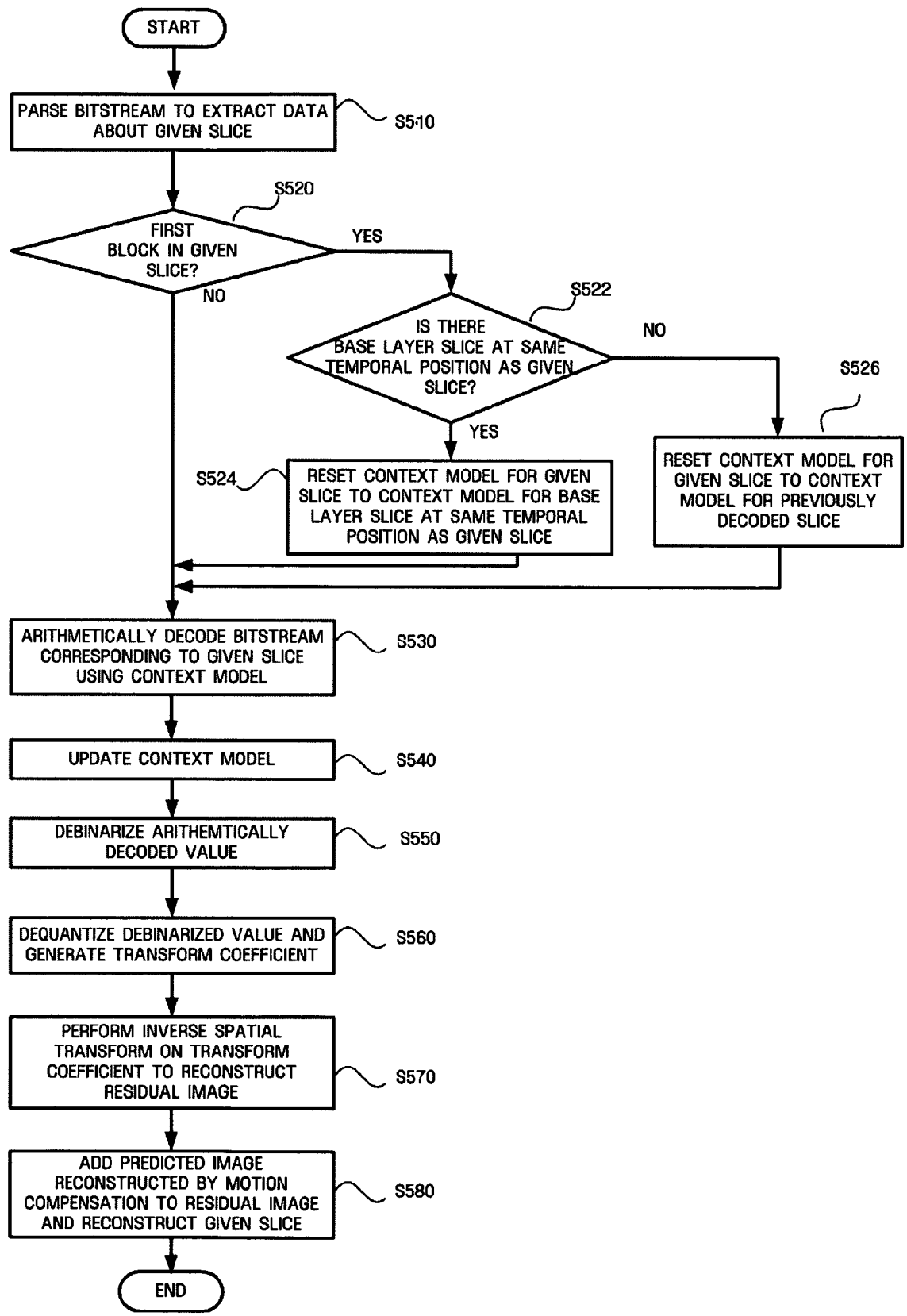
FIG. 5 is a flowchart illustrating a video decoding method including a context-based adaptive arithmetic decoding method according to an exemplary embodiment of the present invention.

FIG. 5 is a flowchart illustrating a video decoding method including a context-based adaptive arithmetic decoding method according to an exemplary embodiment of the present invention.

A decoder parses a received bitstream in order to extract data for reconstructing a video frame in step S510. The data may include information about a selected context model, for example, slice information of the selected context model when one of context models of a slice coded temporally before the given slice is selected for initialization of a context model of the given slice during arithmetic coding performed by an encoder.

When the given block is a first block in a slice (YES in step S520), a context model for the given slice is reset in steps S522 through 526. When there is a base layer slice having the same temporal position as the given slice (YES in the step S522), the context model for the given slice is reset to a context model for the base layer slice in the step S524. Conversely, when there is no base layer slice having the same temporal position as the given slice (NO in the step S522), the context model for the given slice is reset to a context model for a slice decoded temporally before the given slice in the step S526.

The context models for previously decoded slices that can be referred to are as described above with reference to FIGS. 2 and 3.

In step S530, a bitstream corresponding to the slice is arithmetically decoded according to the context model. In step S540, the context model is updated based on the actual value of the decoded data symbol. When context-based adaptive binary arithmetic decoding is used, the arithmetically decoded data symbol is converted or debinarized into a non-binary value in step S550.

In step S560, dequantization is performed on the debinarized data symbol and generates a transform coefficient and, in step S570, inverse spatial transform is performed on the transform coefficient to reconstruct a residual signal for the given slice. In step S580, a predicted image for the given block reconstructed by motion compensation is added to the residual signal, thereby reconstructing the given slice.

Figure 6:
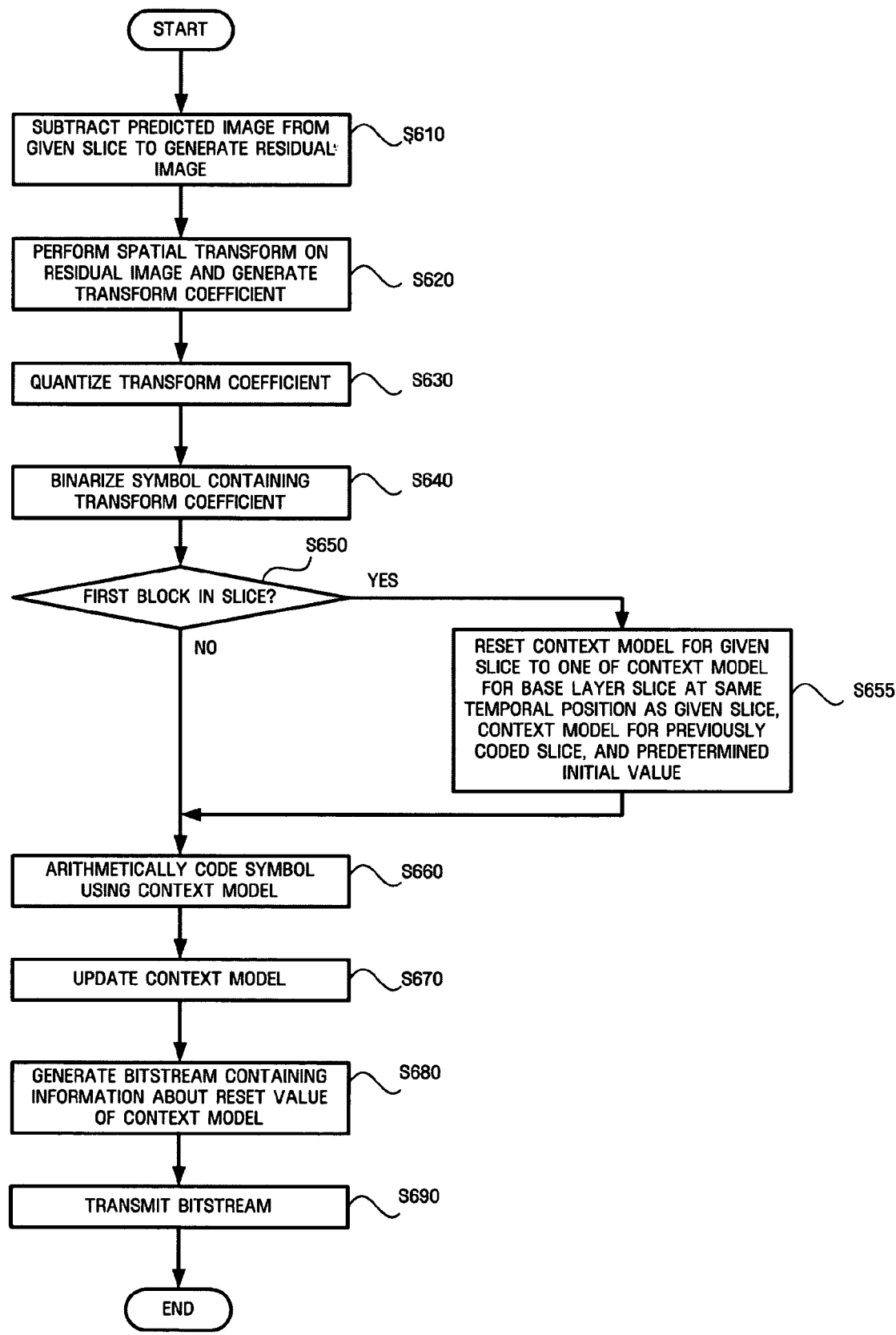
FIG. 6 is a flowchart illustrating a video coding method including a context-based adaptive arithmetic coding method according to an exemplary embodiment of the present invention.

FIG. 6 is a flowchart illustrating a video coding method including a context-based adaptive arithmetic coding method according to an exemplary embodiment of the present invention.

The video coding method includes subtracting a predicted image for a given slice from the given slice to generate a residual image (step S610), performing spatial transform on the residual image and generate a transform coefficient (step S620), quantizing the transform coefficient (step S630), entropy coding the quantized transform coefficient (steps S640 through S670), generating a bitstream (step S680), and transmitting the bitstream to a decoder (step S690).

In the illustrative embodiment, entropy coding is performed in the following manner. In a video coding method in which a CABAC-based context model is initialized for each slice, if the given block is a first block in a given slice (YES in step S650), a context model for the given slice is reset to a context model for a corresponding base layer slice, a context model for a slice coded temporally before the given slice, or a predetermined initial value provided by a video encoder. In other words, the video coding method according to the illustrative embodiment may further comprise selecting one of a context model for a base layer slice corresponding to the given slice in an enhancement layer, a context model for a slice coded temporally before the given slice in the same enhancement layer, and a predetermined initial value provided by a video encoder.

Meanwhile, when only some of probability models constituting a context model of a slice are referred to, the video coding method according to the illustrative embodiment may further comprise selecting a probability model to be used as a reference model.

A selected context model among two or more context models is initialized in step S655 and then arithmetically coded in step S660. In step S670, the context model is updated using an arithmetically coded data symbol value.

A bitstream generated through the above steps may contain information about a slice used in resetting a context model for the given slice, or information about whether or not each of probability models constituting a context model for a slice coded temporally before the given slice has been used as a reference model.

Figure 7:
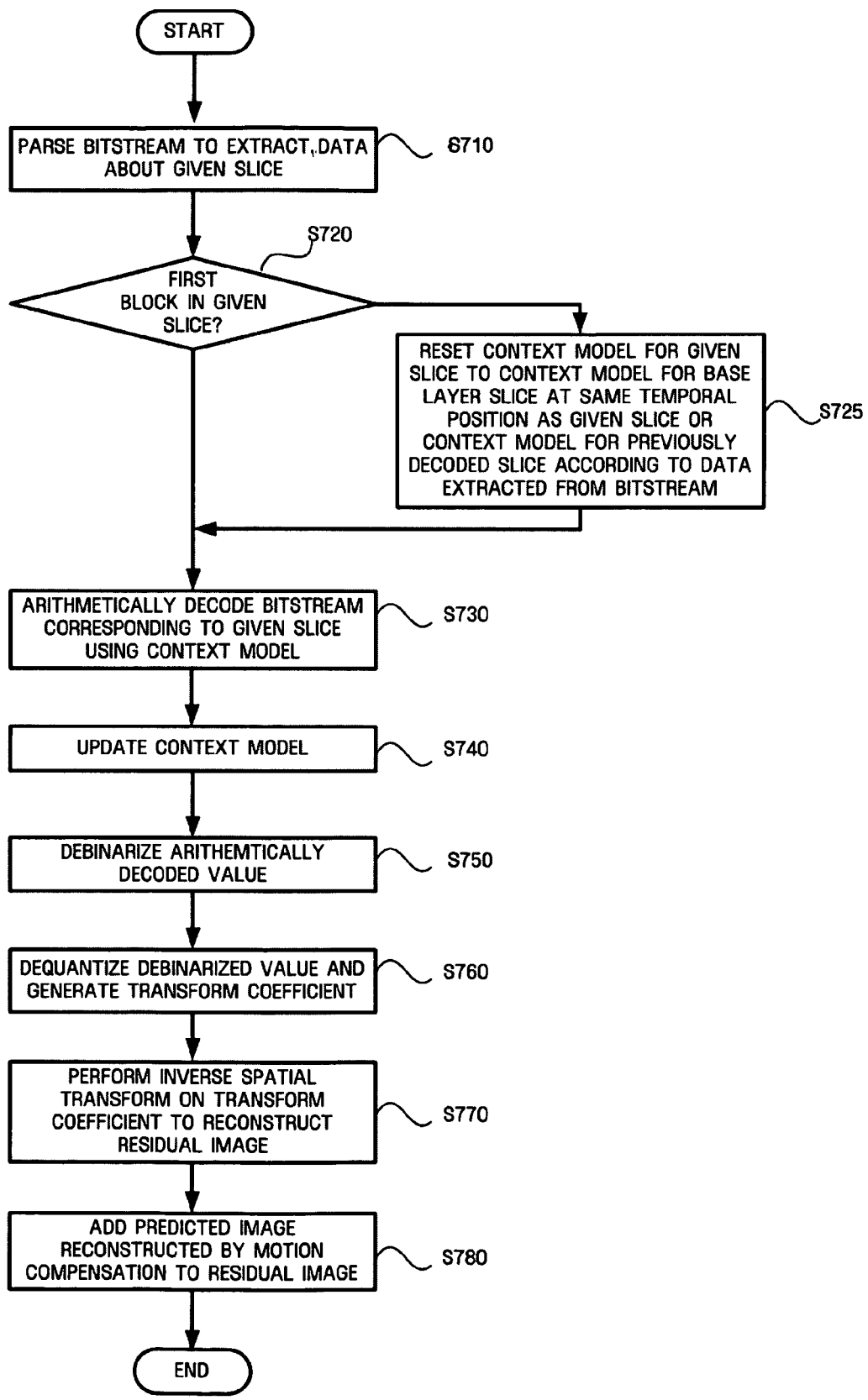
FIG. 7 is a flowchart illustrating a video decoding method including a context-based adaptive arithmetic decoding method according to an exemplary embodiment of the present invention.

FIG. 7 is a flowchart illustrating a video decoding method including a context-based adaptive arithmetic decoding method according to an exemplary embodiment of the present invention.

A video decoder parses a bitstream in order to extract data about a given slice to be reconstructed in step S710. The data about the given slice may include information about a slice used for initializing a context model for the given slice, information about the context model for the given slice, or information about whether or not each of probability models constituting a context model for a slice coded temporally before the given slice has been used as a reference model.

When a currently decoded block is a first block in the given slice (YES in step S720), a context model for the given slice is reset to either a context model for a corresponding base layer slice or a context model for a slice decoded temporally before the given slice according to the information about an initial value of the context model extracted from the bitstream in step S725.

In step S730, a bitstream corresponding to the given slice is arithmetically decoded using the context model. In step S740, the context model is updated based on the value of arithmetically decoded data symbol. In step S750, the arithmetically decoded value is converted or debinarized into a non-binary value. In step S760, dequantization is performed on the debinarized value and a transform coefficient is generated. However, when context-based adaptive binary arithmetic coding (CABAC) is not used, the debinarization step S750 may be skipped.

The video decoder performs inverse spatial transform on the transform coefficient to reconstruct a residual image in step S770 and adds a predicted image reconstructed by motion compensation to the residual image in order to reconstruct the given slice in step S780.

Figure 8:
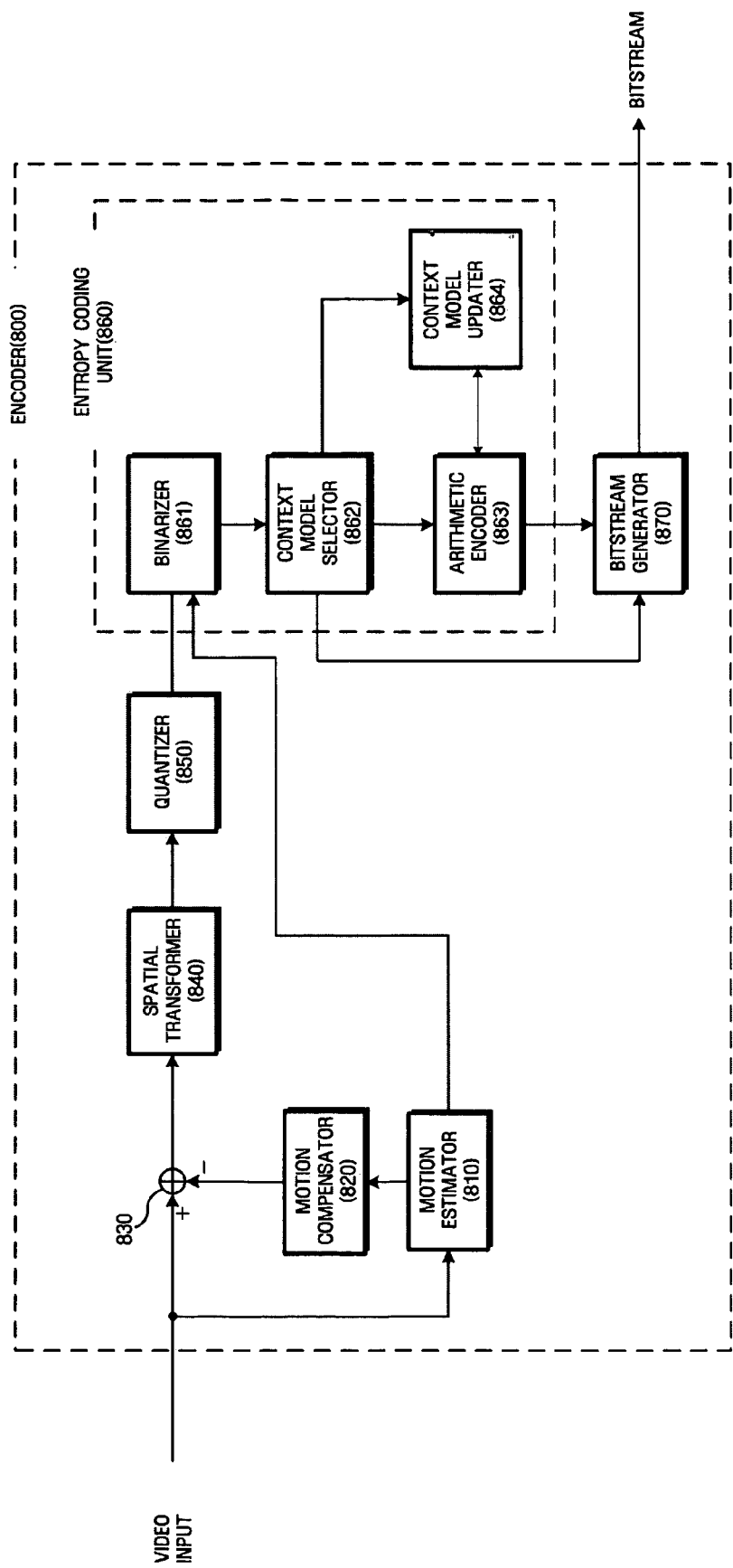
FIG. 8 is a block diagram of a video encoder according to an exemplary embodiment of the present invention.

FIG. 8 is a block diagram of a video encoder 800 according to an exemplary embodiment of the present invention.

The video encoder 800 includes a spatial transformer 840, a quantizer 850, an entropy coding unit 860, a motion estimator 810, and a motion compensator 820.

The motion estimator 810 performs motion estimation on a given frame among input video frames using a reference frame to obtain motion vectors. A block matching algorithm is widely used for the motion estimation. In detail, a given motion block is moved in units of pixels within a particular search area in the reference frame, and displacement giving a minimum error is estimated as a motion vector. For motion estimation, hierarchical variable size block matching (HVSBM) may be used. However, in exemplary embodiments of the present invention, simple fixed block size motion estimation is used. The motion estimator 810 transmits motion data such as motion vectors obtained as a result of motion estimation, a motion block size, and a reference frame number to the entropy coding unit 860.

The motion compensator 820 performs motion compensation on the reference frame using the motion vectors calculated by the motion estimator 810 and generates a predicted frame for the given frame.

A subtractor 830 calculates a difference between the given frame and the predicted frame in order to remove temporal redundancy within the input video frame.

The spatial transformer 840 uses spatial transform technique supporting spatial scalability to remove spatial redundancy within the frame in which temporal redundancy has been removed by the subtractor 830. The spatial transform method may include a Discrete Cosine Transform (DCT), or wavelet transform. Spatially-transformed values are referred to as transform coefficients.

The quantizer 850 applies quantization to the transform coefficient obtained by the spatial transformer 840. Quantization means the process of expressing the transform coefficients formed in arbitrary real values by discrete values, and matching the discrete values with indices according to the predetermined quantization table. The quantized result value is referred to as a quantized coefficient.

The entropy coding unit 860 losslessly codes data symbols including the quantized transform coefficient obtained by the quantizer 850 and the motion data received from the motion estimator 810. The entropy coding unit 860 includes a binarizer 861, a context model selector 862, an arithmetic encoder 863, and a context model updater 864.

The binarizer 861 converts the data symbols into a binary value that is then sent to the context model selector 862. The binarizer 861 may be omitted when CABAC is not used.

The context model selector 862 selects either an initial value predefined as an initial value of a context model for a given slice or a context model for a slice coded temporally before the given slice. Information about the selected initial value of the context model is sent to a bitstream generator 870 and inserted into a bitstream for transmission. Meanwhile, when a method of referring to slices coded temporally before the given slice in order to initialize a context model for a given slice is predefined between an encoder part and a decoder part, the context model selector 862 may not be provided.

The arithmetic encoder 863 performs context-based adaptive arithmetic coding on data symbols of a given block using the context model.

The context model updater 864 updates the context model based on the value of the arithmetically coded data symbol.

To support closed-loop coding in order to reduce a drifting error caused due to a mismatch between an encoder and a decoder, the video encoder 800 may further include a dequantizer and an inverse spatial transformer.

FIG. 9 is a block diagram of a video decoder 900 according to an exemplary embodiment of the present invention.

The video decoder 900 includes a bitstream parser 910, an entropy decoding unit 920, a dequantizer 930, an inverse spatial transformer 940, and a motion compensator 950.

The bitstream parser 910 parses a bitstream received from an encoder to extract information needed for the entropy decoding unit 920 to decode the bitstream.

The entropy decoding unit 920 performs lossless decoding that is the inverse operation of entropy coding to extract motion data that are then fed to the motion compensator 950 and texture data that are then fed to the dequantizer 930. The entropy decoding unit 920 includes a context model setter 921, an arithmetic decoder 922, a context model updater 923, and a debinarizer 924.

The context model setter 921 initializes a context model for a slice to be decoded according to the information extracted by the bitstream parser 910. The information extracted by the bitstream parser 910 may contain information about a slice having a context model to be used as an initial value of a context model for a given slice and information about a probability model to be used as the initial value of the context model for the given slice. In the exemplary embodiments of the present invention, context models independent of type of the block in a slice may be initialized.

The arithmetic decoder 922 performs context-based adaptive arithmetic decoding on a bitstream corresponding to data symbols of the given slice according to the context model set by the context model setter 921.

The context model updater 923 updates the given context model based on the value of the arithmetically decoded data symbol. When context-based adaptive binary arithmetic decoding is used, the debinarizer 924 converts the decoded binary values obtained by the arithmetic decoder 922 into non-binary values. The debinarizer performs inversely binarizing data.

The dequantizer 930 dequantizes texture information received from the entropy decoding unit 920. The dequantization is a process of obtaining quantized coefficients from matched quantization indices received from the encoder.

The inverse spatial transformer 940 performs inverse spatial transform on coefficients obtained after the dequantization to reconstruct a residual image in a spatial domain. The motion compensator 950 performs motion compensation on the previously reconstructed video frame using the motion data from the entropy decoding unit 920 and generates a motion-compensated frame.

When the residual image reconstructed by the inverse spatial transformer 940 is generated using temporal prediction, an adder 960 adds a motion-compensated image received from the motion compensator 950 to the residual image in order to reconstruct a video frame.

In FIGS. 8 through 9, various components mean, but are not limited to, software or hardware components, such as a Field Programmable Gate Arrays (FPGAs) or Application Specific Integrated Circuits (ASICs), which perform certain tasks. The components may advantageously be configured to reside on the addressable storage media and configured to execute on one or more processors. The functionality provided for in the components and modules may be combined into fewer components and modules or further separated into additional components and modules.

While the invention has been shown and described with reference to context models initialized in units of slices by way of several exemplary embodiments, it should be understood by those skilled in the art that the present invention is not limited to the above-mentioned exemplary embodiments and context models can also be initialized within the scope of the invention.

As described above, context-based adaptive arithmetic coding and decoding methods and apparatuses of the present invention according to the exemplary embodiments of the present invention provide at least the following advantages.

First, the video coding and decoding methods and apparatuses can improve overall coding efficiency and reduce error propagation by initializing a context model for a given slice to a context model for a base layer slice.

Second, the video coding and decoding methods and apparatuses also provide improved coding performance by initializing a context model for a given slice to one of context models for two or more previously coded slices.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A method for performing context-based adaptive arithmetic coding on a given slice in an enhancement layer frame of a video signal comprising a multi-layered structure, the method comprising:

resetting a context model for the given slice to a context model for a base layer slice at the same temporal position as the given slice;

arithmetically coding a data symbol of the given slice using the reset context model; and updating the context model based on a value of the arithmetically coded data symbol.

2. The method of claim 1, further comprising binarizing the data symbol, wherein the data symbol of the given slice is the binarized data symbol.

3. The method of claim 1, wherein the resetting of the context model for the given slice comprises:

if there is the base layer slice at the same temporal position as the given slice, resetting the context model for the given slice to the context model for the base layer slice; and if there is no base layer slice at the same temporal position as the given slice, resetting the context model for the given slice to a context model for a slice coded temporally before the given slice.

4. The method of claim 3, wherein the context model for the slice coded temporally before the given slice is one selected among context models for at least two slices coded temporally before the given slice.

5. The method of claim 3, wherein the context model for the slice coded temporally before the given slice is a context model selectively comprising at least one among a plurality of probability models contained in the context model for the slice coded temporally before the given slice.

6. The method of claim 1, wherein the base layer slice at the same temporal position as the given slice is a slice of a low-pass frame or high-pass frame in the base layer.

7. The method of claim 1, wherein the context model for the base layer slice at the same temporal position as the given slice is a context model selectively comprising at least one among a plurality of probability models contained in the context model for the base layer slice.

8. A method for performing context-based adaptive arithmetic decoding on a given slice in an enhancement layer frame of a video signal comprising a multi-layered structure, the method comprising:

reselling a context model for the given slice to a context model for a base layer slice at the same temporal position as the given slice;

arithmetically decoding a bitstream corresponding to the given slice using the reset context model to generate a data symbol of the given slice; and updating the context model based on a value of the data symbol.

9. The method of claim 8, further comprising debinarizing the data symbol.

10. The method of claim 8, wherein the resetting of the context model for the given slice comprises:
   if there is the base layer slice at the same temporal position as the given slice, resetting the context model for the given slice to the context model for the base layer slice; and
   if there is no base layer slice at the same temporal position as the given slice, resetting the context model for the given slice to a context model for a slice decoded temporally before the given slice.

11. The method of claim 10, wherein the context model for the slice decoded temporally before the given slice is one selected among context models for at least two slices decoded temporally before the given slice.

12. The method of claim 10, wherein the context model for the slice decoded temporally before the given slice is a context model selectively comprising at least one among a plurality of probability models contained in the context model for the slice decoded temporally before the given slice.

13. The method of claim 8, wherein the base layer slice at the same temporal position as the given slice is a slice of a low-pass frame or high-pass frame in the base layer.

14. The method of claim 8, wherein the context model for the base layer slice at the same temporal position as the given slice is a context model selectively comprising at least one among a plurality of probability models contained in the context model for the base layer slice.

15. A method for performing context-based adaptive arithmetic coding on a given slice in an enhancement layer frame of a video signal comprising a multi-layered structure, the method comprising:
   selecting at least one of a context model for a base layer slice at the same temporal position as the given slice, a context model for a slice coded temporally before the given slice, a context model for a slice positioned at a temporally lower level and closest to the given slice, and a predetermined value;
   resetting the context model for the given slice to the selected context model or predetermined value;
   arithmetically coding a data symbol of the slice using the reset context model; and
   updating the context model based on a value of the arithmetically coded data symbol.

16. The method of claim 15, further comprising binarizing the data symbol, wherein the data symbol of the given slice is the binarized data symbol.

17. The method of claim 15, wherein the base layer slice at the same temporal position as the slice is a slice of a low-pass frame or high-pass frame in the base layer.

18. The method of claim 15, wherein the context model for the base layer slice at the same temporal position as the given slice is a context model selectively comprising at least one among a plurality of probability models contained in the context model for the base layer slice.

19. A method for performing context-based adaptive arithmetic coding on a given slice in an enhancement layer frame of a video signal comprising a multi-layered structure, the method comprising:
   resetting a context model for the given slice to at least one of a context model for a base layer slice at the same temporal position as the given slice, a context model for a slice coded temporally before the given slice, and a predetermined value;
   arithmetically coding a data symbol of the slice using the reset context model; and
   updating the context model based on a value of the arithmetically coded data symbol,
   wherein the resetting comprises determining whether the data symbol is a symbol for a first block of among a plurality of blocks if the given slice comprises the plurality of blocks,
   wherein if the data symbol is not the symbol for the first block, the resetting does not occur and the arithmetic coding is performed using the updated context model.

20. A method for performing context-based adaptive arithmetic decoding on a given slice in an enhancement layer frame of a video signal comprising a multi-layered structure, the method comprising:
   selecting at least one of a context model for a base layer slice at the same temporal position as the given slice, a context model for a slice coded temporally before the given slice, a context model for a slice positioned at a temporally lower level and closest to the given slice, and a predetermined value;
   resetting the context model for the given slice to the selected context model or predetermined value;
   arithmetically decoding a bitstream corresponding to the given slice using the reset context model to generate a data symbol of the given slice; and
   updating the context model based on a value of the data symbol.

21. The method of claim 20, further comprising debinarizing the data symbol, wherein the data symbol of the slice is a binarized data symbol.

22. The method of claim 20, wherein the base layer slice at the same temporal position as the given slice is a slice of a low-pass frame or high-pass frame in the base layer.

23. The method of claim 20, wherein the context model for the base layer slice at the same temporal position as the given slice is a context model selectively comprising at least one among a plurality of probability models contained in the context model for the base layer slice.

24. A method for performing context-based adaptive arithmetic decoding on a given slice in an enhancement layer frame of a video signal comprising a multi-layered structure, the method comprising:
   resetting a context model for the given slice to at least one of a context model for a base layer slice at the same temporal position as the given slice, a context model for a slice coded temporally before the given slice, and a predetermined value;
   arithmetically decoding a bitstream corresponding to the given slice using the reset context model to generate a data symbol of the given slice; and
   updating the context model based on a value of the data symbol,
   wherein the resetting comprises determining whether the bitstream comprises a data symbol for a first block among a plurality of blocks if the given slice comprises the plurality of blocks,
   wherein if the bitstream does not comprise the data symbol for the first block of the plurality of blocks, the resetting does not occur and the arithmetic decoding is performed using the updated context model.

25. A video coding method comprising a method for performing context-based adaptive arithmetic coding on a given slice in an enhancement layer frame comprising a multi-layered structure, the video coding method comprising:
   subtracting a predicted image for the given slice from the given slice and generating a residual image;

performing spatial transform on the residual image and generating a transform coefficient;

quantizing the transform coefficient;

resetting a context model for the given slice to a context model for a base layer slice at the same temporal position as the given slice;

arithmetically coding a data symbol of the given slice using the reset context model;

updating the context model based on a value of the arithmetically coded data symbol;

generating a bitstream comprising the arithmetically coded data symbol; and transmitting the bitstream.

26. The method of claim 25, further comprising binarizing the data symbol, wherein the data symbol of the given slice is the binarized data symbol.

27. The method of claim 25, wherein the resetting of the context model for the given slice comprises:
if there is the base layer slice at the same temporal position as the given slice, resetting the context model for the given slice to the context model for the base layer slice; and
if there is no base layer slice at the same temporal position as the given slice, resetting the context model for the given slice to a context model for a slice coded temporally before the given slice.

28. The method of claim 27, wherein the context model for the slice coded temporally before the given slice is one selected among context models for at least two slices coded temporally before the given slice.

29. The method of claim 27, wherein the context model for the slice coded temporally before the given slice is a context model selectively comprising at least one among a plurality of probability models contained in the context model for the slice coded temporally before the given slice.

30. The method of claim 27, wherein the bitstream comprises information about whether each of probability models constituting a context model for a slice coded temporally before the given slice has been used.

31. The method of claim 25, wherein the base layer slice at the same temporal position as the given slice is a slice of a low-pass frame or high-pass frame in the base layer.

32. The method of claim 25, wherein the context model for the base layer slice at the same temporal position as the given slice is a context model selectively comprising at least one among a plurality of probability models contained in the context model for the base layer slice.

33. The method of claim 25, wherein the bitstream comprises information about whether or not each of probability models constituting a context model for the base layer slice at the same temporal position as the given slice has been used as a reference model.

34. A video decoding method comprising a method for performing context-based adaptive arithmetic decoding on a given slice in an enhancement layer frame comprising a multi-layered structure, the video decoding method comprising:
parsing a bitstream and extracting data about the given slice to be reconstructed;
resetting a context model for the given slice to a context model for a base layer slice at the same temporal position as the given slice according to the data;
arithmetically decoding a bitstream corresponding to the given slice using the reset context model to generate a data symbol of the given slice;
updating the context model based on a value of the data symbol;
dequantizing the data symbol to generate a transform coefficient;
performing inverse spatial transform on the transform coefficient and reconstructing a residual image obtained by subtracting a predicted image from the given slice; and
adding the predicted image reconstructed by motion compensation to the reconstructed residual image and reconstructing the given slice.

35. The method of claim 34, further comprising debinarizing the data symbol.

36. The method of claim 34, wherein the resetting of the context model for the given slice comprises:
if there is the base layer slice at the same temporal position as the given slice, resetting the context model for the given slice to the context model for the base layer slice; and
if there is no base layer slice at the same temporal position as the given slice, resetting the context model for the given slice to a context model for a slice decoded temporally before the given slice.

37. The method of claim 36, wherein the data comprises information about whether or not each of probability models constituting a context model for a slice coded temporally before the given slice has been used as a reference model.

38. The method of claim 34, wherein the base layer slice at the same temporal position as the given slice is a slice of a low-pass frame or high-pass frame in the base layer.

39. The method of claim 34, wherein the data comprises information about whether or not each of probability models constituting a context model for the base layer slice at the same temporal position as the given slice has been used as a reference model.

40. A method for coding a given slice in an enhancement layer frame of a video signal comprising a multi-layered structure, the method comprising:
subtracting a predicted image for the given slice from the given slice and generating a residual image;
performing spatial transform on the residual image and generating a transform coefficient;
quantizing the transform coefficient;
selecting at least one of a context model for a base layer slice at the same temporal position as the given slice, a context model for a slice coded temporally before the given slice, a context model for a slice positioned at a temporally lower level and closest to the given slice, and a predetermined value;
resetting the context model for the given slice to the selected context model or predetermined value:
arithmetically coding a data symbol of the given slice using the reset context model;
updating the context model based on a value of the arithmetically coded data symbol;
generating a bitstream comprising the arithmetically coded data symbol; and
transmitting the bitstream.

41. The method of claim 40, further comprising binarizing the data symbol, wherein the data symbol of the given slice is the binarized data symbol.

42. The method of claim 40, wherein the base layer slice at the same temporal position as the given slice is a slice of a low-pass frame or high-pass frame in the base layer.

43. The method of claim 40, wherein the context model for the base layer slice at the same temporal position as the given slice is a context model selectively comprising at least one among a plurality of probability models contained in the context model for the base layer slice.

44. The method of claim 40, wherein the bitstream comprises information about whether or not each of probability models constituting a context model for a slice coded temporally before the given slice has been used as a reference model.

45. A method for decoding a given slice in an enhancement layer frame of a video signal comprising a multi-layered structure, the method comprising:
parsing a bitstream and extracting data about the given slice to be reconstructed;
selecting at least one of a context model for a base layer slice at the same temporal position as the given slice, a context model for a slice coded temporally before the given slice, a context model for a slice positioned at a temporally lower level and closest to the given slice, and a predetermined value;
resetting the context model for the given slice to the selected context model or predetermined value; arithmetically decoding a bitstream corresponding to the given slice using the reset context model to generate a data symbol of the given slice;
updating the context model based on a value of the data symbol;
dequantizing the data symbol to generate a transform coefficient;
performing inverse spatial transform on the transform coefficient to reconstruct a residual image obtained by subtracting a predicted image from the given slice; and
adding the predicted image reconstructed by motion compensation to the reconstructed residual image and reconstructing the given slice.

46. The method of claim 45, further comprising debinarizing the data symbol, wherein the data symbol of the given slice is a binarized data symbol.

47. The method of claim 45, wherein the base layer slice at the same temporal position as the given slice is a slice in a base layer low-pass frame.

48. The method of claim 45, wherein the data comprises information about whether or not each of probability models constituting a context model for a slice coded temporally before the given slice has been used as a reference model.

49. A video encoder for compressing a given slice in an enhancement layer frame comprising a multi-layered structure, the encoder comprising:
a unit which subtracts a predicted image for the given slice from the given slice and generates a residual image;
a unit which performs spatial transform on the residual image and generates a transform coefficient;
a unit which quantizes the transform coefficient;
a unit which resets a context model for the given slice to a context model for a base layer slice at the same temporal position as the given slice;
a unit which arithmetically codes a data symbol of the given slice using the reset context model;
a unit which updates the context model based on a value of the arithmetically coded data symbol;
a unit which generates a bitstream comprising the arithmetically coded data symbol; and
a unit which transmits the bitstream.

50. A video decoder for reconstructing a given slice in an enhancement layer frame comprising a multi-layered structure, the decoder comprising:
a unit which parses a bitstream and extracts data about the given slice to be reconstructed;
a unit which resets a context model for the given slice to a context model for a base layer slice at the same temporal position as the given slice according to the data;
a unit which arithmetically decodes a bitstream corresponding to the given slice using the reset context model to generate a data symbol of the given slice;
a unit which updates the context model based on a value of the data symbol;
a unit which dequantizes the data symbol to generate a transform coefficient;
a unit which performs inverse spatial transform on the transform coefficient to reconstruct a residual image obtained by subtracting a predicted image from the given slice; and
a unit which adds the predicted image reconstructed by motion compensation to the reconstructed residual image and reconstructs the given slice.

51. A video encoder for compressing a given slice in an enhancement layer frame comprising a multi-layered structure, the encoder comprising:
a unit which subtracts a predicted image for the given slice from the given slice and generates a residual image;
a unit which performs spatial transform on the residual image and generates a transform coefficient;
a unit which quantizes the transform coefficient;
a unit which selects at least one of a context model for a base layer slice at the same temporal position as the given slice, a context model for a slice coded temporally before the given slice, a context model for a slice positioned at a temporally lower level and closest to the given slice, and a predetermined value;
a unit which resets the context model for the given slice to the selected context model or predetermined value;
a unit which arithmetically codes a data symbol of the given slice using the reset context model;
a unit which updates the context model based on a value of the arithmetically coded data symbol;
a unit which generates a bitstream comprising the arithmetically coded data symbol; and
a unit which transmits the bitstream.

52. A video decoder for reconstructing a given slice in an enhancement layer frame comprising a multi-layered structure, the decoder comprising:
a unit which parses a bitstream and extracts data about the given slice to be reconstructed;
a unit which selects at least one of a context model for a base layer slice at the same temporal position as the given slice, a context model for a slice coded temporally before the given slice, a context model for a slice positioned at a temporally lower level and closest to the given slice, and a predetermined value;
a unit which resets the context model for the given slice to the selected context model or predetermined value;
a unit which arithmetically decodes a bitstream corresponding to the given slice using the reset context model to generate a data symbol of the given slice;
a unit which updates the context model based on a value of the data symbol;
a unit which dequantizes the data symbol to generate a transform coefficient;
a unit which performs inverse spatial transform on the transform coefficient to reconstruct a residual image obtained by subtracting a predicted image from the given slice; and a unit which adds the predicted image reconstructed by motion compensation to the reconstructed residual image and reconstructs the given slice.

53. A computer-readable recording program medium having a program for implementing the method of claim 1.

54. A computer-readable recording program medium having a program for implementing the method of claim 8.

55. A computer-readable recording program medium having a program for implementing the method of claim 15.

56. A computer-readable recording program medium having a program for implementing the method of claim 20.

57. A computer-readable recording program medium having a program for implementing the method of claim 25.

58. A computer-readable recording program medium having a program for implementing the method of claim 34.

59. A computer-readable recording program medium having a program for implementing the method of claim 40.

60. A computer-readable recording program medium having a program for implementing the method of claim 45.

* * * * *